United States Patent [19]

Grims et al.

[11] Patent Number: 4,715,221

[45] Date of Patent: Dec. 29, 1987

[54] MOLD CAVITY VOLUME MEASURING APPARATUS

[75] Inventors: Conrad M. Grims, Golden; Lawrence B. Eldridge, Littleton, both of Colo.

[73] Assignee: Adolph Coors Company, Golden, Colo.

[21] Appl. No.: 893,149

[22] Filed: Aug. 5, 1986

[51] Int. Cl.[4] ............................................. G01F 17/00
[52] U.S. Cl. ..................................................... 73/149
[58] Field of Search ................................ 73/149, 290 B

[56] References Cited

U.S. PATENT DOCUMENTS

| | | | |
|---|---|---|---|
| 2,270,505 | 1/1942 | Burleson | 73/149 |
| 2,606,442 | 8/1952 | Raines | 73/149 |
| 2,662,400 | 12/1953 | Weiner et al. | 73/149 |
| 2,667,782 | 2/1954 | Shea | 73/149 |
| 2,877,647 | 3/1959 | Handy et al. | 73/149 |
| 2,924,096 | 2/1960 | Humphres | 73/149 |
| 3,487,682 | 1/1970 | Whitehead, Jr. | 73/149 |
| 3,741,011 | 6/1973 | Seybold | 73/149 |

*Primary Examiner*—Tom Noland
*Attorney, Agent, or Firm*—Klaas & Law

[57] ABSTRACT

An apparatus for measuring the volume of a mold cavity of the type having a plurality of small dimension air venting passages in communication with the mold cavity. The apparatus includes an extensible membrane enclosure which is inserted into the mold cavity and filled with liquid from a liquid-holding vessel connected to the extensible membrane enclosure. Measurement of liquid in the liquid-holding vessel with a calibrated scale assembly is made prior to and subsequent to filling of the extensible membrane enclosure for determining the volume of the mold cavity.

4 Claims, 7 Drawing Figures

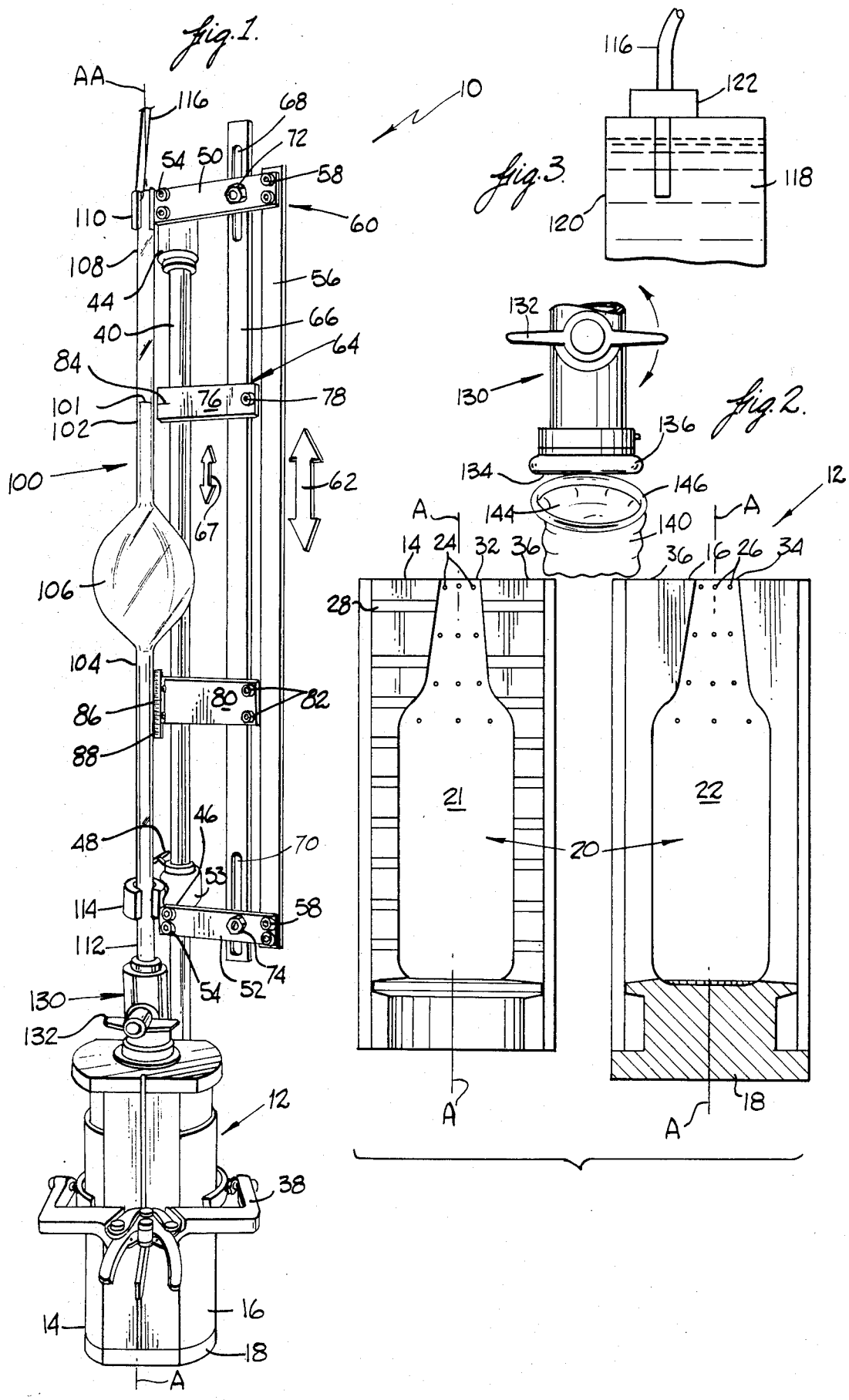

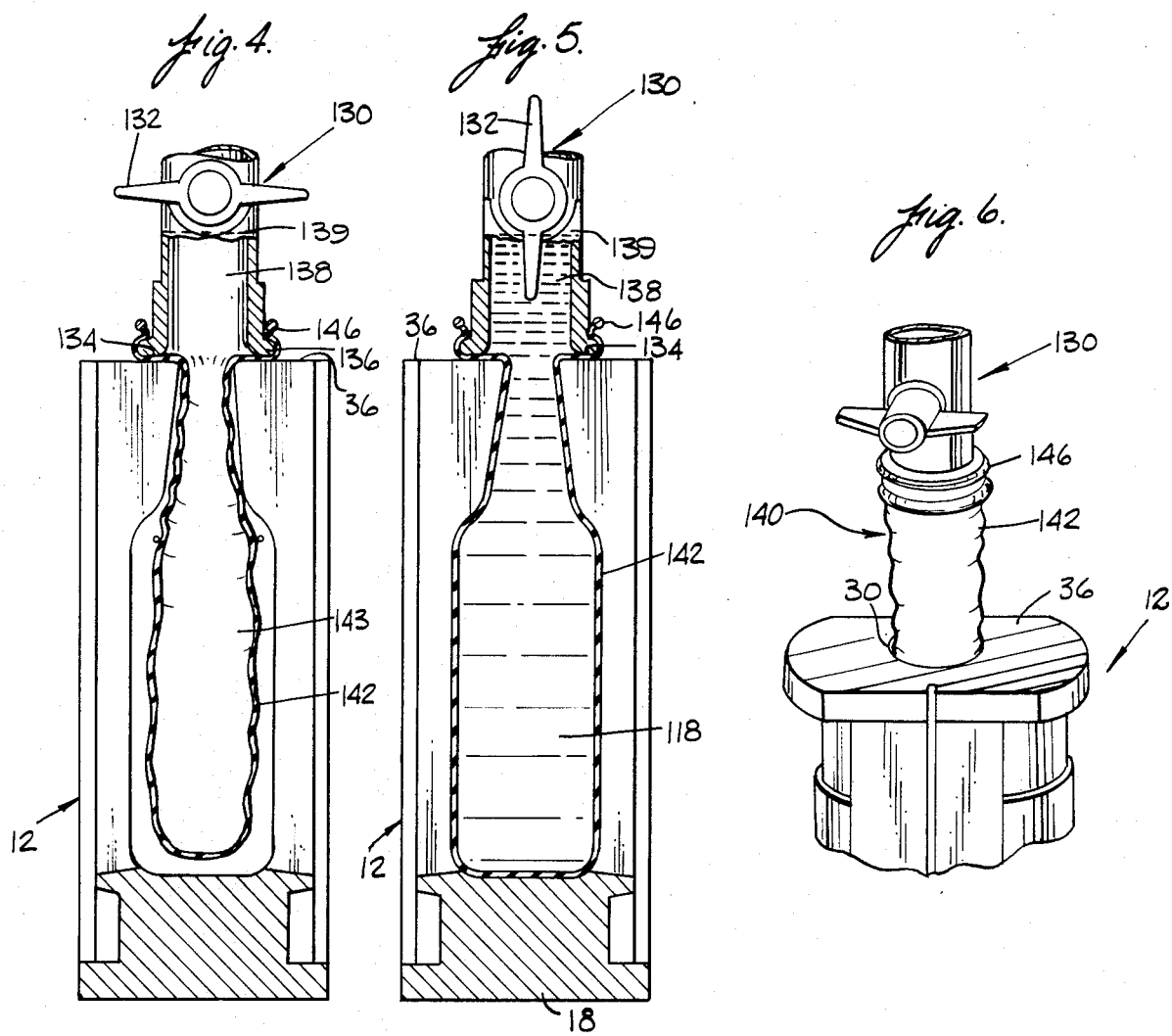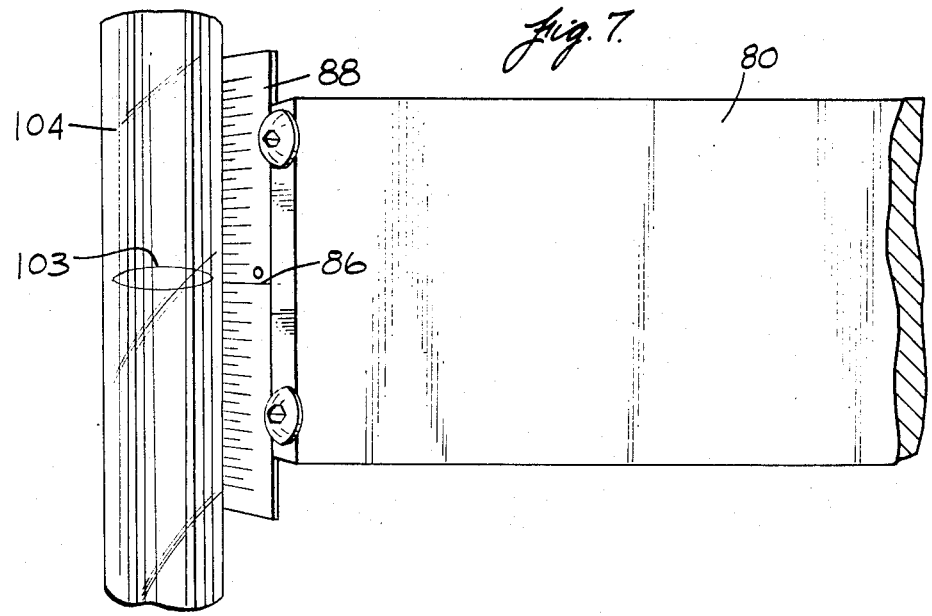

MOLD CAVITY VOLUME MEASURING APPARATUS

BACKGROUND OF THE INVENTION

The present invention relates generally to blow molding operations and, more particularly, to a method and apparatus for rapidly measuring the volume of a mold to ensure that it falls within predetermined volume tolerances.

Blow molding has long been used for formation of hollow articles such as glass bottles. In blow molding operations a mold having left and right halves and a separate bottom is employed. The mold portions, when connected together, form a cavity having the shape of the article to be formed. The mold cavity has a relatively large opening therein for holding a parison which is used to produce a finished blow molded article. A compressed air source is attached at the cavity opening in sealed fluid communication with the parison in the mold cavity. The compressed air source forces air into the parison, causing it to expand into the mold cavity to form a hollow article in the shape of the mold cavity. As the parison expands into the mold cavity, air trapped in the mold cavity is vented from the cavity through small air passageways in the various mold portions. After the article formed from the blow molding process has cooled, the mold portions are separated and the article is removed.

In mass production bottle forming operations, the amount of material used to form a bottle and the volume of the mold cavity in which the bottle is formed must be very precisely controlled so that the volume of the finished bottle is uniform. Even a relatively small error in the control of these two parameters may result in a bottle having the appearance of being underfilled or overfilled with liquid at the completion of bottle filling operations.

The method of testing mold cavity volume which is the present industry standard requires grease to be applied to the interior of the mold cavity to cover the various air passageways in the mold which are used to vent air from the mold cavity during blowing of a parison. After grease is applied to the mold cavity air vents, the cavity walls must be carefully wiped down to remove excess grease. Next, the mold is clamped together and water in a beaker of known volume is poured into the mold cavity. When the water level in the cavity approaches the cavity opening at the top of the mold, the pouring process in stopped and water is thereafter added to the mold cavity by means of a syringe device. In this final stage of filling, water is removed from the beaker with the syringe and used to fill the mold cavity to the top. The remaining water in the syringe is then returned to the beaker. Finally, the water remaining in the beaker is carefully weighed to determine what volume of water has been used to fill the mold cavity. After the volume measuring operation has been completed, the grease in the air passageways of the mold cavity must be removed in a degreasing operation which generally involves immersion of the mold cavity in a degreasing agent and subsequent rinsing of the mold cavity. In a typical test lab, this method of measuring the volume of a mold cavity generally takes between 30 minutes and 1 hour and tends to be a somewhat messy operation due to the use of grease solvent, etc. It is also possible that the grease used to cover air vent passageways has a tendency to adhere to air bubbles formed when water is added to the mold cavity, and thus affects the accuracy of this volume measuring method.

It would be generally desirable to provide a mold cavity testing method and apparatus which enables a mold cavity volume test to be performed quickly, cleanly, and accurately.

SUMMARY OF THE INVENTION

The present invention is directed to a method and apparatus which enables the volume of a mold cavity to be tested quickly, cleanly, and accurately. The invention utilizes an extensible membrane enclosure which is inserted into the cavity of the assembled mold without prior greasing of the mold cavity walls. An upper portion of the membrane is sealingly engaged with a peripheral portion of the mold cavity opening and a measuring liquid is used to expand the membrane into totally filling relationship with the mold cavity. The measuring liquid is dispensed from a liquid-holding vessel which is sealingly attached in interruptible fluid communication with the extensible membrane enclosure. A measuring device, which is preferably a linear distance measuring device operably associated with a vessel of predetermined cross-sectional configuration, is used to measure the difference in volume of liquid in the liquid-holding vessel between an initial state wherein the vessel is filled with liquid and the mold cavity and membrane have no liquid therein, and a second state in which water from the vessel has been discharged into the membrane enclosure to totally fill the mold cavity. The measuring device is preferably calibrated to account for the volume of liquid positioned between a lower valve portion of the liquid-holding vessel and the top of the mold cavity opening. The measuring device is also preferably calibrated to account for the volume of the expandable membrane enclosure which is disposed within the mold cavity. After such calibrations, the volume of the mold cavity may be read directly from the measuring device. After the measurement has been made, the valve at the bottom of the liquid-containing vessel is closed, the mold cavity is opened and moved away from the expanded extensible membrane enclosure, and finally the enclosure is removed from its connection with the liquid-holding vessel, emptied of liquid, and discarded. Using this invention, no initial preparation of the mold, nor subsequent cleaning of the mold, nor manual filling of the mold cavity is required, and the entire measuring operation generally takes less than five minutes.

Thus, the invention may comprise: an apparatus for measuring the volume of the cavity of a mold of the type used for blow molding and having a plurality of relatively small dimension air passageways in fluid communication with the mold cavity for venting air from the cavity during molding and having a single opening into the mold cavity for enabling the injection of air into the cavity during molding, the cavity opening being associated with an outer interfacing surface of the mold which is adapted to sealingly interface with an air blowing assembly, the apparatus comprising: (a) extensible membrane enclosure means, having a single enclosure opening therein and being insertable into said mold cavity through said mold cavity opening for expandably receiving a volume of liquid therein in totally filling relationship with said mold cavity and in nonfilling relationship with said air passageways; (b) liquid-holding means in selectively openable and closeable fluid communication with said extensible membrane enclosure means for receiving and holding a selected volume of liquid during a first holding state and for discharging a portion of said selected volume of liquid into said extensible membrane enclosure means and holding the remaining portion of said selected volume of liquid during a second holding state; (c) said liquid-holding means comprising valve means for enabling holding of said selected volume of liquid therein and for enabling discharge of a portion of said selected volume of liquid therefrom into said extensible membrane enclosure means; (d) connector means for sealingly connecting said extensible membrane enclosure means with said liquid-holding means and having a fluid passage way therein extending between said valve means and said extensible membrane enclosure means; (e) liquid supply means for selectably supplying liquid to said liquid-holding means; (f) measuring means operatively associated with said liquid-holding means for measuring the difference in the volume of liquid in said liquid-holding means between said first holding state and said second holding state; (g) membrane positioning and sealing means for positioning an upper portion of said extensible membrane enclosure means proximate the opening thereof in sealed relationship with interfacing surface of said mold whereby said extensible membrane is expandable into the entire volume of said mold cavity and only into said mold cavity by said liquid discharged into said extensible membrane from said liquid-holding means; (h) whereby the volume of said mold cavity is equal to the difference in the volume of liquid in said liquid-holding means between said first holding state and said second holding state plus the volume of the membrane of said extensible membrane enclosure means extending into said mold cavity less the volume of liquid positioned in said fluid passageway between said valve means and said extensible membrane enclosure means.

The invention may also comprise: an apparatus for measuring the volume of the cavity of a mold of the type used for blow molding comprising a plurality of relatively small dimension air passageways in fluid communication with the mold cavity for venting air from the cavity during molding and having a single opening into the mold cavity for enabling the injection of air into the cavity during molding, the cavity opening being associated with an outer interfacing surface of the mold which is adapted to sealingly interface with an air blowing assembly, the apparatus comprising: (a) extensible membrane enclosure means, having a single enclosure opening therein and being insertable into said mold cavity through said mold cavity opening for expandably receiving a volume of liquid therein in totally filling relationship with said mold cavity and in nonfilling relationship with said air passageways; (b) liquid-holding means in selectively openable and closeable fluid communication with said extensible membrane enclosure means for receiving and holding a selected volume of liquid during a first holding state and for discharging a portion of said selected volume of liquid into said extensible membrane enclosure means and holding the remaining portion of said selected volume of liquid during a second holding state; wherein said liquid-holding means comprises a transparent column with a predetermined cross sectional configuration wherein the linear distance between the liquid level in said first holding state and the liquid level in said second holding state is indicative of the volume of liquid discharged from said liquid-holding means to said extensible membrane enclosure means; (c) said liquid-holding means comprising valve means for enabling holding of said selected volume of liquid therein and for enabling discharge of a portion of said selected volume of liquid therefrom into said extensible membrane enclosure means; (d) connector means for sealingly connecting said extensible membrane enclosure means with said liquid-holding means and having a fluid passage way therein extending between said valve means and said extensible membrane enclosure means; (e) liquid supply means for selectably supplying liquid to said liquid-holding means; (f) measuring means operatively associated with said liquid-holding means for measuring the difference in the volume of liquid in said liquid-holding means between said first holding state and said second holding state; wherein said measuring means is calibrated to account for said volume of said liquid in said fluid passageway between said valve means and said extensible membrane enclosure means and for said volume of the membrane of said extensible membrane enclosure means; wherein said measuring means comprises metered distance means having a first register indicia adapted to be aligned with the liquid level position of said liquid-holding means during said first liquid-holding state and having a second register indicia adapted to be positioned proximate the liquid level position of said liquid-holding means during said second liquid-holding state, said first register indicia and said second register indicia being spaced apart by a fixed preselected distance which is representative of a preselected measuring volume approximately equal to the volume of the mold cavity being measured; whereby, when the actual volume of said mold cavity is equal to said preselected measuring volume, said lower register mark is positioned in exact alignment with said liquid level in said liquid-holding means in said second holding state; and whereby, when the actual volume of said mold cavity is different from said preselected measuring volume, said lower register mark is positioned in offset relationship with said liquid level in said second-holding state, the offset distance being proportional to the difference in volume between the actual volume of said mold cavity and said preselected measuring volume; further comprising scale indicia associated with said second register indicia for measuring the distance between the second register indicia and the liquid level of said liquid-holding means in said second holding state for determining the difference between the actual volume of the mold cavity and said preselected measuring volume; wherein said metered distance means is slidingly moveable relative said liquid-holding means for enabling said first register indicia to be moved into alignment with said liquid level in said first holding state; (g) membrane positioning and sealing means for positioning an upper portion of said extensible membrane enclosure means proximate the opening thereof in sealed relationship with interfacing surface of said mold whereby said extensible membrane is expandable into the entire volume of said mold cavity and only into said mold cavity by said liquid discharged into said extensible membrane from said liquid-holding means; wherein said membrane positioning means comprises: slide means for enabling sliding movement of said connector means and said extensible membrane enclosure means attached thereto in a direction substantially in axial alignment with the central axis of said mold cavity opening; interfacing surface means on said connector means adapted to abutt with said interfacing surface of said mold whereby an annular portion of said extensible membrane enclosure means positioned proximate the opening of said extensible membrane enclosure means is sealingly engaged between said interfacing surfaces of said connector means and said mold cavity when said surfaces are urged into abutting relationship by sliding movement of said slide means; (h) whereby the volume of said mold cavity is equal to the difference in the volume of liquid in said liquid-holding means between said first holding state and said second holding state plus the volume of the membrane of said extensible membrane enclosure means extending into said mold cavity less the volume of liquid positioned in said fluid passageway between said valve means and said extensible membrane enclosure means.

The invention may also comprise: a method for measuring the volume of a mold cavity of a mold of the type used for blow molding comprising a plurality of relatively small dimension air passageways in fluid communication with the mold cavity for venting air from the cavity during molding and having a single opening into the mold cavity for enabling the injection of air into a parison positioned in the cavity during molding comprising the steps of: (a) providing a balloon-like, extensible membrane device having an opening at one end; (b) inserting the balloon-like device into the mold cavity; (c) providing a liquid-holding vessel having an openable and closeable discharge orifice therein; (d) placing said balloon-like device opening in fluid communication with said liquid-holding vessel discharge orifice; (e) prior to filling said balloon-like device with liquid, closing said discharge orifice and filling said vessel with more than sufficient liquid to fill said mold cavity; (f) opening said discharge orifice so as to allow liquid from said vessel to fill the balloon-like device; (g) using a linear measuring device to determine the difference in the liquid volume of said vessel before and after said discharge of liquid into said balloon-like device in said mold cavity; (h) calibrating said linear measuring device to account for the volume of the membrane of said balloon-like device and to account for the volume of liquid retained in a connecting fluid passageway between said discharge orifice and said balloon-like device.

BRIEF DESCRIPTION OF THE DRAWING

FIG. 1 is a perspective view of a mold cavity volume measuring apparatus.

FIG. 2 is a partially cross-sectional, partially exploded front elevation view of a blow mold and a valve adapter assembly and a partially rotated frontal view of an upper portion of an extensible membrane enclosure.

FIG. 3 is a schematic view of a liquid reservoir and pump.

FIG. 4 is a cross sectional elevation view of an empty expandable membrane enclosure inserted in a mold cavity.

FIG. 5 is a cross sectional elevation view of a liquid-filled extensible membrane enclosure expanded in a mold cavity.

FIG. 6 is a detailed perspective view illustrating insertion of an extensible membrane enclosure into a mold cavity using the apparatus of FIG. 1.

FIG. 7 is a detailed perspective view of a portion of a measuring device forming a part of the apparatus of FIG. 1.

DETAILED DESCRIPTION OF THE INVENTION

The present invention comprises a mold cavity volume measuring apparatus 10, which is used to measure the volume of a mold 12 having a first mold half 14, a second mold half 16, and a mold bottom insert 18, FIGS. 1 and 2. The interior walls of the mold portions 14, 16, 18 define a mold cavity 20 having a first cavity half 21, a second cavity half 22 and a central longitudinal axis AA. The cavity 20 has the same shape as an article, such as a bottle, to be formed. Air holes 24, 26 provided in each mold half 14, 16 as well as air channels 28 provided in first mold half 14 enable air to be vented from the mold cavity during the blowing of a parison (not shown) to form a completed blow-molded article (not shown). A cavity circular opening 30, FIG. 6, defines an upper terminal end of the mold cavity 20 and comprises a first semicircular half 32 and a second semicircular half 34, FIG. 2, associated with the two mold halves. A top, flat, horizontally disposed, exterior surface 36 of the mold encompasses opening 30 and is adapted to abuttingly interface with a compressed air injecting apparatus (not shown) which is used in the blowing of a parison. A conventional mold clamping device 38, FIG. 1, is used to hold the mold portions 14, 16, 18 together during mold cavity testing operations.

The mold cavity volume measuring apparatus 10 of the present invention includes, in general, an extensible membrane enclosure means such as balloon-shaped, thin-walled, expandable membrane 140, which is insertable into the mold cavity 20 through the mold cavity opening 30 for expandably receiving a volume of liquid therein in totally filling relationship with the mold cavity and in non-filling relationship with the associated mold cavity air passageways 24, 26, 28, etc., FIGS. 4, 5 and 6; a liquid-holding means such as glass vessel 100, FIG. 1, in selectively interruptible fluid communication with the extensible membrane enclosure means; a valve means such as valve assembly 130 mounted at a lower portion of the liquid-holding means for selectively enabling discharge of liquid from the liquid-holding means into the extensible membrane enclosure means; connector means, which may also comprise the valve assembly 130, for connecting the extensible membrane enclosure means with the liquid-holding means; a liquid supply means, such as liquid reservoir 120, FIG. 3, for selectively supplying liquid to the liquid-holding means; a membrane positioning and sealing means, such as movable frame assembly 60, for positioning an upper portion of the extensible membrane enclosure means in sealed relationship with an interfacing surface of the mold whereby the extensible membrane is expandable into the entire volume of the mold cavity and only into the mold cavity by liquid discharged into the extensible membrane means from the liquid-holding means; and measuring means, such as vertically slidable volume measuring assembly 64, which is operatively associated with the liquid-holding means for measuring the difference in the volume of liquid in the liquid-holding means between a first holding state in which the liquid vessel is filled with valve assembly 132 closed and a second holding state, in which a portion of the volume from the first holding state has been discharged into the extensible membrane enclosure means by opening of valve 132. The volume of the mold cavity is determined from the difference in volume between the first liquid-holding state and the second liquid-holding state.

Having thus described the invention in general, various features and operations of the volume measuring assembly 10 will now be described in further detail. A vertically extending support member 40, such as e.g. a ½ inch stainless steel rod, may be mounted in a horizontally extending base (not shown). The member 40 has a pair of sliding members 44, 46 slidably mounted thereon. At least one of the sliding members has a clamping screw 48 conventionally mounted therein for selective clamping of the sliding member in fixed relationship with the vertical support member 40. Horizontally extending frame members 50, 52 are connected to the sliding members 44, 46 by conventional attachment means such as brackets 53 and bolts 54, etc. A vertically extending frame member 56 is connected at either end to the two horizontally extending frame members as by bolts 58. A rectangular-shaped movable frame assembly 60 is thus provided by sliding members 44, 46 and frame members 50, 52, 56. The movable frame assembly 60 is movable in a vertical direction indicated at 62 in generally parallel relationship with the central longitudinal axis AA of the mold cavity 20.

A volume measuring assembly 64 is provided having a measuring assembly vertically sliding member 66 slidably mounted on movable frame assembly 60 and slidingly movable with respect thereto in a direction 67 parallel to direction 62, as illustrated in FIG. 1. The sliding member 66 comprises a pair of elongate vertically extending slots 68, 70 by which it is slidably attached to horizontal frame members 50, 52 by bolt assemblies 72, 74. An upper horizontal measuring member 76 is fixedly attached as by bolt 78 to vertically slidable member 66. A lower horizontal measuring member 80 is fixedly attached to vertically sliding member 66 as by bolts 82. Upper horizontal measuring member 76 comprises an upper water level registration mark 84 thereon which is adapted to be positioned opposite an upper water level position 101, FIG. 1, associated with a first liquid-holding state of vessel 100. A lower water level registration mark 86 is provided on lower horizontal measuring member 80 and is adapted to be positioned proximate a lower water level position 103, FIG. 7, associated with a second liquid-holding state of vessel 100. A measuring scale 88, FIG. 7, enabling the measurement of deviation of the lower water level 103 from the lower water registration mark 86 is also provided on lower horizontal measuring member 80. The horizontal measuring members 76, 80 are constructed and arranged so as to have register marks 84, 86 and measuring scale 88 positioned in immediately adjacent relationship with glass vessel 100.

As illustrated by FIG. 1, the liquid-holding means preferably comprises a glass vessel 100 having an upper, relatively small, constant diameter, tubular portion 102; a lower, relatively small, constant diameter, tubular portion 104 which preferably has an identical diameter to upper portion 102, e.g. ½ inch; and an intermediate, relatively large diameter, bulbous portion 106 positioned between upper and lower tubular portions 102, 104. The liquid-holding means comprises an upper end 108 fixedly attached as by upper clamping apparatus 110 to movable frame assembly 60 and a lower end 112 fixedly attached as by lower clamping apparatus 114 to movable frame assembly 60. A flexible conduit 116 is attached in fluid communication with the glass vessel upper end 108. As shown by FIG. 3, liquid 118 which is preferably water treated with a de-bubbling agent is supplied from a liquid reservoir 120 as by a pumping unit 122 which is operably connected to flexible conduit 116. A valve assembly 130 is provided at the lower end 112 of liquid vessel 100 and may comprise a hand-controllable open/close knob 132. The valve assembly also comprises a flat, horizontally-disposed bottom surface 134, FIG. 2, having a radially, outwardly-extending annular lip portion 136 thereon. An internal fluid passageway 138 in the valve assembly extends between a valve orifice shut-off position 139 and bottom surface 134 and comprises a volume which is accounted for when calibrating the mold cavity volume measuring apparatus 10 as further described below.

The expandable membrane enclosure means may comprise a balloon-shaped, thin-walled, expandable membrane 140 which in one embodiment comprises a conventional condom such as a Sheik R non-lubricated, plain end condom manufactured by Schmidt Products Company, a division of Schmidt Laboratories, Inc., Little Falls, N.J. 07424. The expandable membrane comprises an elongate body portion 142 which defines an internal membrane cavity 143. The expandable membrane comprises an opening 144 at one end thereof having a peripheral elastic portion 146 associated therewith which is adapted to be positioned over radially outwardly-extending annular lip 136 of valve assembly 130 to form an airtight seal therewith. The walls of the membrane are shown in exaggerated thickness in FIGS. 4 and 5 for facilitating the description of the invention.

Operation of the apparatus 10 will now be described. To commence the volume measuring operations, the mold assembly 12 is clamped together using a conventional clamping apparatus such as illustrated at 38, FIG. 1. Next, the expandable membrane 140 is connected to the lower portion of valve assembly 130 by placing peripheral elastic portion 146 in elastically sealing relationship over lip portion 136. Next, sliding assembly 60 is moved into a relatively raised position and the mold assembly 12 is positioned immediately below valve assembly 130. Next, the expandable membrane 140 is inserted into cavity opening 30 as illustrated in FIG. 6. Next, the movable frame assembly 60 is moved downwardly and the valve assembly flat horizontally-disposed surface 134 is moved into tight abutting engagement with mold upper horizontally-disposed surface 36 with an annular portion of the membrane body 142 sealingly engaged between the flat surfaces 36, 134 as illustrated in FIG. 4. Next, pump 122 is actuated to fill vessel 100 sufficiently so that the upper water level 101 is located in the upper, relatively small diameter portion 102 of the vessel. Next, the measuring assembly vertically sliding member 66 is moved to a position whereat upper registration mark 84 is positioned directly opposite upper water level 101, FIG. 1. Next, as illustrated in FIG. 5, valve assembly 130 is opened, releasing a portion of the water 118 in vessel 100 into the extensible membrane 140. The extensible membrane 140 is sufficiently expandable such that the entire volume of cavity 20 is filled by the discharge of water from vessel 100 into membrane 140, as illustrated in FIG. 5. The extensible membrane is, however, sufficiently thick-walled and firm so as to prevent the expansion of the member into the air holes and air passageways 24, 26, 28, etc. The volume of vessel bulbous portion 106 is adapted to be somewhat less than the total volume of the mold cavity to be measured, e.g. 10% to 20% less, such that the discharge of liquid from the holding vessel 100 causes the water level to be displaced from a position in the upper small diameter portion 102 to a position in the lower small diameter portion 104. The register marks 84, 86 are positioned at a known distance apart and are preferably positioned at a distance such that the lower registration mark 86 will be positioned exactly at the lower water level 103 when measuring a mold cavity having a volume conforming exactly to a predetermined design volume. Using this arrangement, a scale 88 extending upwardly and downwardly from the lower register mark 86 may be used to measure any deviation in the lower liquid level 103 from the register mark 86 and, based upon the known internal diameter of the vessel lower portion 104, any deviation in the volume of the mold cavity 20 from a designed volume may be read directly from the position of lower liquid level 103 relative scale 88.

It will be appreciated from the above that the volume difference between a high level water mark 101 associated with a first liquid-holding state, and a low water level mark 103 associated with a second liquid-holding state is actually equal to the entire volume of the mold cavity 20, less the volume of the portion of the extensible membrane 140 extending into the mold cavity, plus the volume of liquid in liquid passage 138 between the mold cavity and the valve assembly orifice 139 as defined by a closed state of the valve. It will also be appreciated that the apparatus 10 may be calibrated to take into account the volume of passageway 138 and the volume of expandable membrane 140 by setting the distance between marks 84 and 86 at the distance between high and low water levels 101, 103 encounter when using a mold cavity of a known correct design size and when using a standard sized expandable membrane 140 attached in a standard manner over lip portion 136 of valve assembly 130.

At the completion of the volume measuring operation, the mold cavity is opened and the extensible membrane is simply removed from the end of the valve assembly, and emptied of liquid. The extensible membrane 140 may thereafter be reused or another standard sized extensible membrane may be used instead during the next volume measuring operation.

It is contemplated that the inventive concepts herein described may be variously otherwise embodied and it is intended that the appended claims be construed to include alternative embodiments of the invention except insofar as limited by the prior art.

What is claimed is:

1. An apparatus for measuring the volume of the cavity of a mold of the type used for blow molding and having a plurality of relatively small dimension air passageways in fluid communication with the mold cavity for venting air from the cavity during molding and having a single opening into the mold cavity for enabling the injection of air into the cavity during molding, the cavity opening being associated with an outer interfacing surface of the mold which is adapted to sealingly interface with an air blowing assembly, the apparatus comprising:

(a) extensible membrane enclosure means, having a single enclosure opening therein and being insertable into said mold cavity through said mold cavity opening for expandably receiving a volume of liquid therein in totally filling relationship with said mold cavity and in nonfilling relationship with said air passageways;

(b) liquid-holding means in selectively openable and closeable fluid communication with said extensible membrane enclosure means for receiving and holding a selected volume of liquid during a first holding state and for discharging a portion of said selected volume of liquid into said extensible membrane enclosure means and holding the remaining portion of said selected volume of liquid during a second holding state;

(c) said liquid-holding means comprising valve means for enabling holding of said selected volume of liquid therein and for enabling discharge of a portion of said selected volume of liquid therefrom into said extensible membrane enclosure means;

(d) connector means for sealingly connecting said extensible membrane enclosure means with said liquid-holding means and having a fluid passage way therein extending between said valve means and said extensible membrane enclosure means;

(e) liquid supply means for selectably supplying liquid to said liquid-holding means;

(f) measuring means operatively associated with said liquid-holding means for measuring the difference in the volume of liquid in said liquid-holding means between said first holding state and said second holding state;

(g) membrane positioning and sealing means for positioning an upper portion of said extensible membrane enclosure means proximate the opening thereof in sealed relationship with said interfacing surface of said mold whereby said extensible membrane means is expandable into the entire volume of said mold cavity and only into said mold cavity by said liquid discharged into said extensible membrane means from said liquid-holding means;

(h) whereby the volume of said mold cavity is equal to the difference in the volume of liquid in said liquid-holding means between said first holding state and said second holding state plus the volume of the membrane of said extensible membrane enclosure means extending into said mold cavity less the volume of liquid positioned in said fluid passageway between said valve means and said extensible membrane enclosure means;

(i) wherein said liquid-holding means comprises a transparent column with a predetermined cross sectional configuration wherein the linear distance between the liquid level in said first holding state and the liquid level in said second holding state is indicative of the volume of liquid discharged from said liquid-holding means to said extensible membrane enclosure means;

(j) wherein said measuring means comprises metered distance means having a first register indicia adapted to be aligned with the liquid level position of said liquid-holding means during said first liquid-holding state and having a second register indicia adapted to be positioned proximate the liquid level position of said liquid-holding means during said second liquid-holding state, said first register indicia and said second register indicia being spaced apart by a fixed preselected distance which is representative of a preselected measuring volume approximately equal to the volume of the mold cavity being measured; whereby, when the actual volume of said mold cavity is equal to said preselected measuring volume, said lower register mark is positioned in exact alignment with said liquid level in said liquid-holding means in said second holding state; and whereby, when the actual volume of said mold cavity is different from said preselected measuring volume, said lower register mark is positioned in offset relationship with said liquid level in said second-holding state, the offset distance being proportional to the difference in volume between the actual volume of said mold cavity and said preselected measuring volume.

2. The invention of claim 1 further comprising scale indicia associated with said second register indicia for measuring the distance between the second register indicia and the liquid level of said liquid-holding means in said second holding state for determining the difference between the actual volume of the mold cavity and said preselected measuring volume.

3. The invention of claims 1 wherein said metered distance means is slidingly moveable relative said liquid-holding means for enabling said first register indicia to be moved into alignment with said liquid level in said first holding state.

4. An apparatus for measuring the volume of the cavity of a mold of the type used for blow molding having a plurality of relatively small dimension air passageways in fluid communication with the mold cavity for venting air from the cavity during molding and having a single opening into the mold cavity for enabling the injection of air into the cavity during molding, the cavity opening being associated with an outer interfacing surface of the mold which is adapted to sealingly interface with an air blowing assembly, the apparatus comprising:

(a) extensible membrane enclosure means, having a single enclosure opening therein and being insertable into said mold cavity through said mold cavity opening for expandably receiving a volume of liquid therein in totally filling relationship with said mold cavity and in nonfilling relationship with said air passageways;

(b) liquid-holding means in selectively openable and closeable fluid communication with said extensible membrane enclosure means for receiving and holding a selected volume of liquid during a first holding state and for discharging a portion of said selected volume of liquid into said extensible membrane enclosure means and holding the remaining portion of said selected volume of liquid during a second holding state; wherein said liquid-holding means comprises a transparent column with a predetermined cross sectional configuration wherein the linear distance between the liquid level in said first holding state and the liquid level in said second holding state is indicative of the volume of liquid discharged from said liquid-holding means to said extensible membrane enclosure means;

(c) said liquid-holding means comprising valve means for enabling holding of said selected volume of liquid therein and for enabling discharge of a portion of said selected volume of liquid therefrom into said extensible membrane enclosure means;

(d) connector means for sealingly connecting said extensible membrane enclosure means with said viewable liquid-holding means and having a fluid passage way therein extending between said valve means and said extensible membrane enclosure means;

(e) liquid supply means for selectably supplying liquid to said liquid-holding means;

(f) measuring means operatively associated with said liquid-holding means for measuring the difference in the volume of liquid in said liquid-holding means between said first holding state and said second holding state; wherein said measuring means is calibrated to account for said volume of said liquid in said fluid passageway between said valve means and said extensible membrane enclosure means and for said volume of the membrane of said extensible membrane enclosure means; wherein said measuring means comprises metered distance means having a first register indicia adapted to be aligned with the liquid level position of said liquid-holding means during said first liquid-holding state and having a second register indicia adapted to be positioned proximate the liquid level position of said liquid-holding means during said second liquid-holding state, said first register indicia and said second register indicia being spaced apart by a fixed preselected distance which is representative of a preselected measuring volume approximately equal to the volume of the mold cavity being measured; whereby, when the actual volume of said mold cavity is equal to said preselected measuring volume, said lower register mark is positioned in exact alignment with said liquid level in said liquid-holding means in said second holding state; and whereby, when the actual volume of said mold cavity is different from said preselected measuring volume, said lower register mark is positioned in offset relationship with said liquid level in said second-holding state, the offset distance being proportional to the difference in volume between the actual volume of said mold cavity and said preselected measuring volume; further comprising scale indicia associated with said second register indicia for measuring the distance between the second register indicia and the liquid level of said liquid-holding means in said second holding state for determining the difference between the actual volume of the mold cavity and said preselected measuring volume; wherein said metered distance means is slidingly moveable relative said liquid-holding means for enabling said first register indicia to be moved into alignment with said liquid level in said first holding state;

(g) membrane positioning and sealing means for positioning an upper portion of said extensible membrane enclosure means proximate the opening thereof in sealed relationship with interfacing surface of said mold whereby said extensible membrane is expandable into the entire volume of said mold cavity and only into said mold cavity by said liquid discharged into said extensible membrane from said liquid-holding means; wherein said membrane positioning means comprises:

slide means for enabling sliding movement of said connector means and said extensible membrane enclosure means attached thereto in a direction substantially in axial alignment with a central axis of said mold cavity opening;

interfacing surface means on said connector means adapted to abut with said interfacing surface of said mold whereby an annular portion of said extensible membrane enclosure means positioned proximate the opening of said extensible membrane enclosure means is sealingly engaged between said interfacing surfaces of said connector means and said mold cavity when said surfaces are urged into abutting relationship by sliding movement of said slide means;

(h) whereby the volume of said mold cavity is equal to the difference in the volume of liquid in said liquid-holding means between said first holding state and said second holding state plus the volume of the membrane of said extensible membrane enclosure means extending into said mold cavity less the volume of liquid positioned in said fluid passageway between said valve means and said extensible membrane enclosure means.

* * * * *